(12) United States Patent
Cappelli et al.

(10) Patent No.: US 11,126,982 B2
(45) Date of Patent: Sep. 21, 2021

(54) AUTOMATED TRANSACTION SYSTEM AND METHOD

(71) Applicant: Diebold Nixdorf Incorporated, North Canton, OH (US)

(72) Inventors: Tom Cappelli, Fort Mill, SC (US); Roy Heilig, Littlestown, PA (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 419 days.

(21) Appl. No.: 15/909,544

(22) Filed: Mar. 1, 2018

(65) Prior Publication Data

US 2018/0253707 A1 Sep. 6, 2018

Related U.S. Application Data

(60) Provisional application No. 62/465,472, filed on Mar. 1, 2017.

(51) Int. Cl.
*G06Q 20/10* (2012.01)
*G06Q 20/02* (2012.01)
(Continued)

(52) U.S. Cl.
CPC ....... *G06Q 20/1085* (2013.01); *G06Q 20/027* (2013.01); *G06Q 20/18* (2013.01);
(Continued)

(58) Field of Classification Search
CPC .. G06Q 20/1085; G06Q 20/108; G06Q 20/10; G06Q 20/08; G06Q 20/00;
(Continued)

(56) References Cited

U.S. PATENT DOCUMENTS

| 8,112,330 B1 * | 2/2012 | Grandcolas .......... G06Q 20/108 |
| | | 705/35 |
| 2005/0203843 A1 * | 9/2005 | Wood .................... G06Q 20/12 |
| | | 705/40 |

(Continued)

OTHER PUBLICATIONS

International Search Report issued in corresponding PCT application; 6 pages.

(Continued)

*Primary Examiner* — Namrata Boveja
*Assistant Examiner* — Divesh Patel
(74) *Attorney, Agent, or Firm* — Black, McCuskey, Souers & Arbaugh LPA

(57) ABSTRACT

A system and method provide for enhanced in-lobby-teller (ILT) machines. A banking system includes a local switch, a bank core, a teller terminal, and an ILT machine. The teller terminal allows a bank teller to approve customer requests entered at an ILT. The ILT receives requests and determines if teller approval is needed for the request. If so, the request is forwarded to a teller/teller terminal. When approved, an indication is set in the banking request and the now approved request is sent back to the ILT machine. The ILT machine detects the approval indication and transmits the request to the external-partner switch. This switch returns the transaction request to the local bank switch for forwarding to the bank core. The core may update account information associated with the banking request and then route it back to the ILT where any remaining tasks of the transaction request are completed.

3 Claims, 11 Drawing Sheets

(51) Int. Cl.
*G07F 19/00* (2006.01)
*G06Q 20/18* (2012.01)
*G06Q 40/02* (2012.01)
*G06Q 20/40* (2012.01)

(52) U.S. Cl.
CPC ........... *G06Q 20/40* (2013.01); *G06Q 40/025* (2013.01); *G07F 19/20* (2013.01); *G07F 19/206* (2013.01); *G07F 19/208* (2013.01); *G07F 19/211* (2013.01)

(58) Field of Classification Search
CPC ...... G06Q 20/027; G06Q 20/02; G06Q 20/18; G06Q 20/40; G06Q 20/38; G06Q 40/025; G06Q 40/02; G06Q 40/00; G07F 19/20; G07F 19/00; G07F 19/206; G07F 19/208; G07F 19/211
See application file for complete search history.

(56) References Cited

U.S. PATENT DOCUMENTS

| | | | | |
|---|---|---|---|---|
| 2006/0026099 | A1* | 2/2006 | Danz | G06Q 30/06 705/44 |
| 2008/0093441 | A1 | 4/2008 | Taylor et al. | |
| 2008/0126245 | A1* | 5/2008 | Rosenberg | G06Q 20/10 705/39 |
| 2009/0032579 | A1* | 2/2009 | Gardner | G06Q 20/042 235/379 |
| 2009/0313129 | A1* | 12/2009 | Rothschild | G06Q 20/04 705/17 |
| 2012/0150708 | A1* | 6/2012 | DeWanz | G06Q 20/4016 705/35 |
| 2014/0129439 | A1* | 5/2014 | Suisa | G06Q 20/108 705/42 |
| 2014/0337221 | A1* | 11/2014 | Hoyos | H04L 63/0861 705/44 |
| 2015/0178697 | A1* | 6/2015 | Rossmann | G07F 19/211 705/43 |
| 2016/0019510 | A1 | 1/2016 | Guntupalli | |
| 2016/0321626 | A1* | 11/2016 | Rossmann | G06Q 20/1085 |

OTHER PUBLICATIONS

Author: International Searching Authority, Patent Cooperation Treaty; Title: Written Opinion of the International Searching Authority; dated May 8, 2015; All pages; International application No. PCTUS2018/020451 (corresponding to the present application).

Author: International Preliminary Examining Authority, Patent Cooperation Treaty; Title: International Preliminary Report on Patentability; dated Jul. 19, 2019; All pages; International application No. PCTUS2018/020451 (corresponding to the present application).

Office Action, dated Oct. 6, 2020, in related U.S. Appl. No. 16/249,048 (25 pages).

* cited by examiner

AUTOMATED TRANSACTION SYSTEM AND METHOD

CROSS-REFERENCE TO RELATED APPLICATIONS

This application claims priority to and the benefit of U.S. Provisional patent Application No. 62/465,472 filed Mar. 1, 2018, the contents of all of which are hereby incorporated by reference in their entirety.

BACKGROUND

Recent technological advancements related to In-Lobby Teller (ILT) terminals have empowered consumers to interact with banking branches in new ways. While this opportunity enhances efficiency, it sometimes can be at the cost of consumer acquisition, engagement, and retention. Newer ILT terminals offer enhanced solutions. They combine the speed and accuracy of a self-service terminal with intelligence from a bank's core systems. For example, the Diebold Nixdorf 9900 ILT links to the staff within the bank to provide around-the-clock service and tailors to many types of transactions, provide a diverse range of services to individuals, and fulfill the needs of many small and medium businesses (SMBs).

Ideally, an ILT machine will have flexible and modular design for enhanced functionality and be designed to meet international accessibility guidelines. Some ILTs may have 19" color touchscreen consumer-viewable display with privacy filter and have both landscape and portrait display options as well as optional video enablement with Concierge Video Services™. Other options may be desirable such as having a cash capacity with a recycling module with up to five cassettes for denomination support and enhanced cash capacity, up to 10,800-note capacity for recycling, deposits of up to 11,500 notes in a five-cassette configuration, up to four cassettes to dispense or recycle (fifth cassette reserved for mix of deposit and reject/dispense retracts), and/or have a pocket-style user interface that accepts 200 notes at one time. Some units may have an optional Advanced Function Dispenser (AFD) the enables fast dispensing and holds an additional 13,000-note capacity and five denominations. ILT advanced features may include an optional barcode reader and coin dispenser, an intelligent depository module for configuration flexibility and the ability to accept stacks of up to 30 checks or bill payment documents in any insertion orientation

SUMMARY

Various configurations relate generally to apparatus, systems, and methods for assisting banking customers. More particularly, the apparatus, systems, and methods relate to assisting banking customers using banking terminals. Specifically, the apparatus, systems, and methods provide for assisting banking customers using banking terminals for generating banking transactions that require teller approval and that are tagged as "off us" transactions before the banking transactions are completed.

One embodiment is a method for processing teller approved banking transaction requests. The method begins by receiving from a banking customer at a bank terminal a banking transaction request that requires approval of a bank teller. The banking transaction request is initiated at a first bank and an account managed by the first bank is accessed over a bank network of the first bank. In some configurations, the banking transaction request is sent to a teller application server and a teller computer. The bank teller will interface with a teller application to indicate that the banking transaction request is approved. The teller application may be running on the teller application server. If the bank teller approves the banking transaction request, the teller application server receives an approval of the banking transaction request from the teller computer. Responsive to the banking transaction request being approved, the banking transaction request is tagged as an approved off-us banking transaction.

Next, this tagged off-us banking transaction is sent to an off-site partner switch. The off-site partner switch determines that a both tagged/approved and off-us banking transaction needs to be rerouted back to the bank network. The banking network of the first bank receives the off-us banking transaction. The off-site partner switch is a certified (hardware tested) banking switch for routing off-us teller approved transactions. At least some equipment connected to the banking network of the first bank at least partially prepares and/or partially executes a portion of the off-us banking transaction. The off-us banking transaction is then sent from the computer network of the first bank through the off-site partner switch and back to the bank terminal. Processing and/or execution of the off-us banking transaction is completed at the banking terminal of first bank.

In some configurations, the bank terminal is an in-lobby-teller (ILT) machine, and the banking transaction request exceeds at least one limit value of a banking transaction that the ILT may execute without requiring approval of the bank teller. The banking transaction request may be one of several transactions, for example, it may be a cash withdrawal (e.g., debit) for an amount that exceeds a withdrawal limit of the bank terminal. For a cash request, the method may mechanically dispense to the banking customer an amount of cash equal to the cash withdrawal amount. The banking transaction request may be a request for two or more different types of currency denominations. Another example request made at the banking terminal may be a request for a small loan that the customer may request and submit to the banking teller for approval. The banking transaction request may be received at a banking terminal that is an ILT machine. The ILT machine may detect that the banking transaction request exceeds an ILT monitory limit of the ILT. Upon detecting the limit has been exceeded, the method (ILT machine) sends the banking transaction request to the teller computer and/or the teller application server for approval.

In one example embodiment, the method may, when tagging the banking transaction request as approved by the bank teller, create a record that includes which teller approved the banking transaction request, what action the teller approved, and/or what time and date the banking transaction request was approved. A teller approval code may be assigned to the off-us banking transaction to indicate which teller approved the request. Information associated with the approval may be stored such as a name of an approving teller, an approval time and date, and/or an action taken by the approving teller.

The transmitting of the off-us banking transaction back and forth between the computer network of the first bank and the off-site partner switch may include transition of other devices/and or other paths as understood by those of ordinary skill in this art. For example, the off-site partner switch may send the off-us banking transaction by first transmitting the off-us banking transaction to a first switch of the banking network. Next, the banking network of the first bank may send the transaction form the first switch to a bank core. Additionally and/or alternatively, the transmitting the off-us banking transaction from the first bank through the off-site partner switch and back to the bank terminal may include transmitting the off-us banking transaction from a bank core to the first bank switch in the bank network and then transmitting it from the first bank switch to the off-site partner switch. In other configurations, the transmitting the off-us banking transaction from the first bank through the off-site partner switch and back to the bank terminal further includes retracing a same path that the off-us banking transaction traveled from the banking terminal to reach the bank terminal. The retracing may include traveling from the first bank, through the off-site partner switch and then back to the bank terminal.

Other configurations may have other useful features, actions, and/or benefits. For example, after teller approval, the off-us banking transaction is processed without further human interaction other than interaction from the banking customer. The off-site partner switch may route a second banking transaction that is a teller approved off-us transaction. The second banking transaction is generated by a second bank that is different than the first bank. The method may reduce the cost of implementing the off-site partner switch so that a cost of the off-site partner switch and it's certification/testing may be borne by the first bank, the second bank, and possible other banks utilizing the service of the off-site partner switch.

Another embodiment is a banking system having one or more in-lobby-teller machines (ILT machines). The system includes a bank core connected/commutatively coupled to a local bank switch. The ILT machine receives a banking transaction request from a banking customer. The ILT machine includes a processor that determines if the banking transaction request requires a human bank teller to approve the banking transaction request. The ILT machine transmits the banking transaction request to the teller terminal when the banking transaction request requires human teller approval and does not send the banking transaction request to the human bank teller when no approval is needed. The system further includes a teller terminal, a local bank switch, and a bank core. The teller terminal allows the human bank teller to approve the banking transaction request. The teller terminal sets an indication marker in the banking transaction request when the banking transaction request is approved. The banking transaction request with the indication set is sent from the teller terminal to the ILT machine as an approved transaction request, and the ILT machine transmits the approved transaction request to an external certified switch. The local bank switch receives the approved transaction request from the external certified switch, and the local bank switch transmits the approved transaction request to the bank core. The bank core receive the approved transaction request from the local bank switch, and the bank core begins transmission of the approved transaction request on a route back to the ILT machine. The ILT machine completes execution and/or documentation of the approved transaction request.

In various embodiments, the bank core transmits the approved transaction request to the local bank switch. The local bank switch then transmits the approved transaction request to the external certified switch, and the external certified switch transmits the approved transaction request back to the ILT machine.

Another embodiment is a method for cashing a check at a bank as an off-us transaction. The method begins by receiving at an ILT a request for cash from a presented check associated with an on-us banking account maintained at the first bank, and the presented check is made out to an "off-us person" without a corresponding banking account at the first bank. The person will need to be verified before the check is cashed so the method generates an authentication message based on an ID of the off-us person to request credential authentication of the off-us person. The authentication message is sent to a switch on a computer network of the first switch. The switch, in some embodiments, will send the authentication message to an external certified server that is external to the first bank and a second bank. The external certified server sends the authentication message to the second bank that maintains the account associated with the off-us person. The second bank will then verify, or not, the off-us person based on information in the authentication message such as a signature, a photo, an eye scan, and the like against records held by the second bank regarding this customer and their checking/banking account at the second bank. The first bank will receive at a core of the first bank an authentication response message that originated at the second bank. The authentication response message works its way back to the network of the first bank, possibly returning through the partner switch until this message reaches the ILT. Responsive to the authentication response message, the ILT and other first bank resources execute the request for cash by dispensing cash in an amount authorized on the presented check.

In some embodiments, the cash request is for an amount of cash that is above an ATM limit for an amount of cash that the ATM is authorized to dispense, but is below an ILT limit for an amount of cash that the ILT is authorized to dispense so the presented check does not require a bank teller's approval.

Another embodiment is an external-partner switch that re-routes off-us banking transactions back to a same bank that generated that banking transaction. The external-partner switch includes a transceiver and external switch logic. The external switch logic may be owned by a third-party and may be shared among two or more different banks. In operation, the transceiver will receive an off-us banking transaction from a first bank that generated the message as a transaction request. This request may be approved to become tagged an off-us banking transaction. The external switch logic re-routes the message based, at least in part, on an address in the message and the tag of the message as an off-us message. The external-partner switch and the external switch logic may be certified according to at least one banking standard. The external switch logic resends the off-us banking transaction back to the first bank where the off-us banking transaction is performable by the first bank. Once back at the first bank, the off-us banking transaction may be performed/executed.

In some embodiments, the external switch logic sends the message to a second bank when an execution of the off-us banking transaction is, at least in part, associated with the second bank. In other embodiments, the second bank approves a signature on a check presented at the first bank because the check is associated with an account maintained by the first bank, and the signature is associated with a banking account maintained by the second bank.

Yet another embodiment is a method of processing a check cashing request. bank 18 may receive a check presented by a first customer that has an account at bank 19 but no account at bank 18, yet the he check was written by Customer A having a banking account at bank 18. A teller may generate the check cashing request with an approval tag indicating that the check cashing request is either teller approved or not teller approved. For example, the approval tag may be set by setting a bit in the check cashing request to a first value indicating the check cashing request has been approved by a teller of bank 19 or setting the bit to a second value to indicate it is not approved. bank 18 also attempts to verify within bank 18 an identity of the first customer by matching photos, signatures, etc. When the first customer has not been verified by bank 18, bank 18 may send a verification request to bank 19 to verify the identity of the first customer. A verification request then received back from bank 19. When Customer A has been verified by either of bank 18 or bank 19, and when the check cashing request has been tagged as teller approved, the check cashing request with the approval tag is sent as an off-us request to a partner switch external to bank 18, bank 18 will receive the check cashing request back from the partner switch and at least partially processes the check cashing request in a core of bank 18 and create a core-processed cashing-request. The core transmits the core-processed cashing-request so that it returns to the partner switch where it is forwarded and returned to bank 18. The core-processed cashing-request is then processed to completion at bank 18, including presenting funds to the first customer.

In some configurations the method captures a first picture of the first customer after the first customer has approached bank 19 with the check. A second picture of the first customer obtained from a controlled source such as a government issued identification (ID) such as a driver's license. The first customer is authenticated by determining if the first customer is the same person in the first picture and the second picture.

In some embodiments, the method further includes receiving the check cashing request from the partner switch into bank 18 at a switch of bank 18. The check cashing request is additionally received into the core of bank 18 from the switch of bank 18.

Another embodiment is a method of processing a banking transaction that involves two different banks. This method begins by receiving a request for a banking transaction at bank 18 presented by the first customer that has an account B at bank 19 but no account at bank 18. The banking transaction is to, in part, access Account A of Customer A at bank 18. The method allows a teller to generate a first transaction request with an approval tag indicating the first transaction request is teller approved. bank 18 attempts to verify within bank 18 an identity of the first customer. When Customer A has not been verified by bank 18, bank 18 will send a verification request to bank 19 requesting bank 19 verify the identity of the first customer. When the first customer has not been verified by bank 18, the verification request is received back from bank 19.

When the first customer has been verified by bank 18 or bank 19, and when the first transaction request has been tagged as teller approved, the method sends the first transaction request with the approval tag as an off-us request to a partner switch external to a first banking network of bank 18. bank 18 receives the first transaction request from the partner switch, at least partially processes the first transaction request in a core of bank 18, and creates an off-us second transaction request. The second transaction request may be needed to fully process the original banking transaction. For example, the first transaction request may be to receive funds from cashing a check drawn from bank 18 and the second transaction request may be to deposit (e.g., credit) those funds in bank 19. The new second transaction request is sent from the first banking network of bank 18 to the partner switch. The second transaction request is then sent from the partner switch to a second banking network of bank 19. The second transaction request is processed at bank 19 by accessing account B of the first customer to produce a receipt message. The receipt message is sent from the second banking network of bank 19 to the partner switch. bank 19 sends the receipt message from the partner switch to bank 18. Any outstanding items related to the original request for a banking transaction are completed by bank 18 and the receipt message is processed to close out the banking transaction.

Another embodiment is a method of processing an ILT request at a bank. This method begins by tagging the ILT request as teller approved at a first bank to create a tagged ILT request. The tagged ILT request is sent as an off-us request to a partner switch external to the bank. The tagged ILT request is received at the bank from the partner switch in a condition to execute the transaction to completion at the bank without requiring action by a second bank. In other configurations, the ILT request is processed to completion within the bank.

Another embodiment is a partner switch that operates independently of any banking network. The partner switch includes a receiver, a transmitter and a switching logic. The receiver receives from a first bank an off-us ILT banking request tagged as approved by a teller. The switching logic, in general, determines where to route different off-us banking transactions/requests. In this case the switching logics determines to route the ILT banking request directly back to the first bank through the transmitter. The ILT banking request may then be fully processed by the first bank without a second bank receiving the ILT banking request. In some configurations, the transmitter transmits the ILT banking request back to a switch in a network of the first bank.

Various aspects will become apparent to those skilled in the art from the following detailed description and the accompanying drawings.

BRIEF DESCRIPTION OF THE DRAWINGS

One or more preferred embodiments that illustrate the best mode(s) are set forth in the drawings and in the following description.

The accompanying drawings, which are incorporated in and constitute a part of the specification, illustrate various example methods and other example embodiments of various aspects. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In addition, it is appreciated that the figures provided herewith are for explanation purposes to persons ordinarily skilled in the art and that the drawings are not necessarily drawn to scale and that some portions of some drawings may be exaggerated so that some details may more easily be seen and described. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE DRAWINGS

Figure 1:
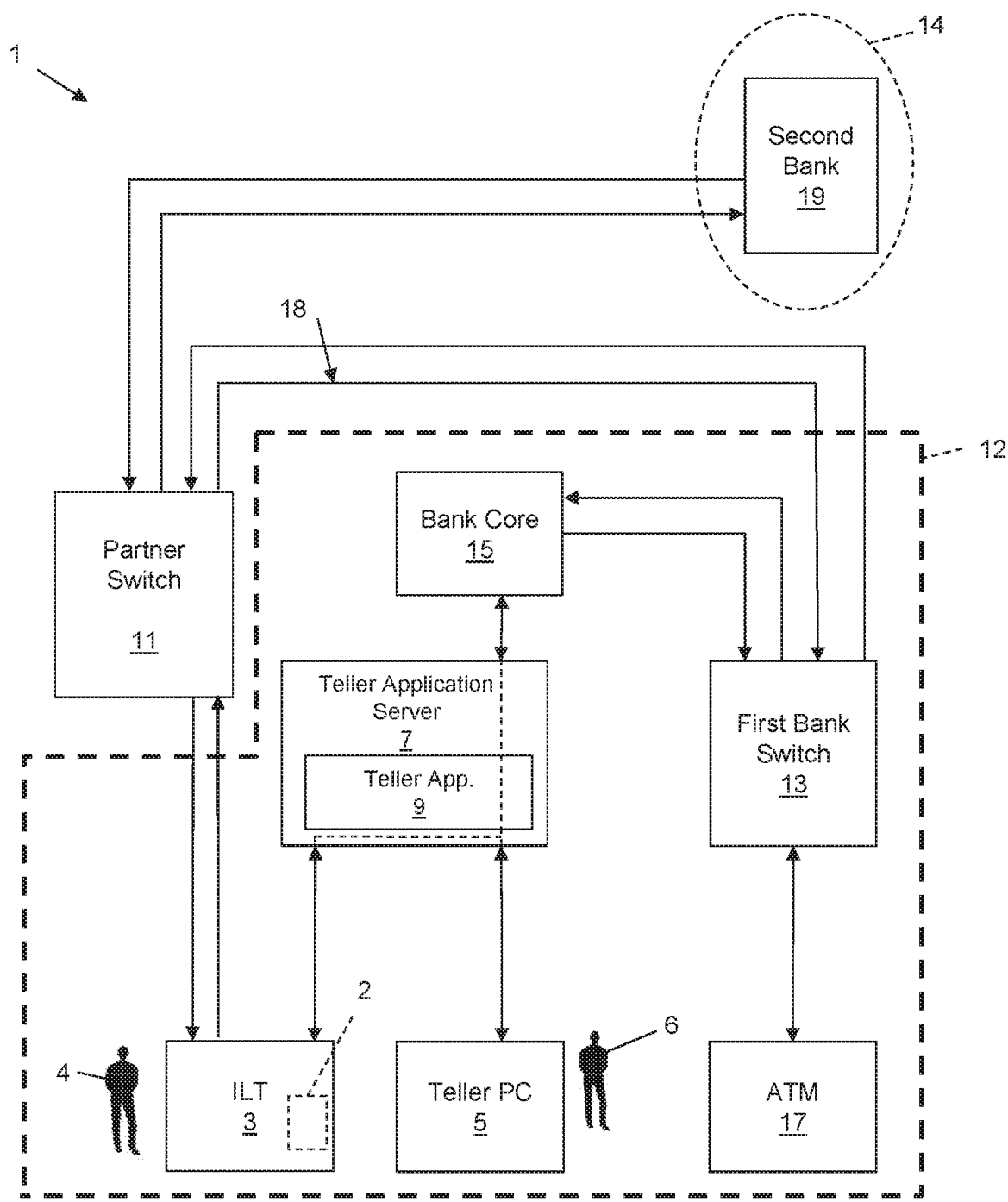
FIG. 1 illustrates one example embodiment of a system for processing tagged off-us banking transactions using a partner switch.
Figure 3:
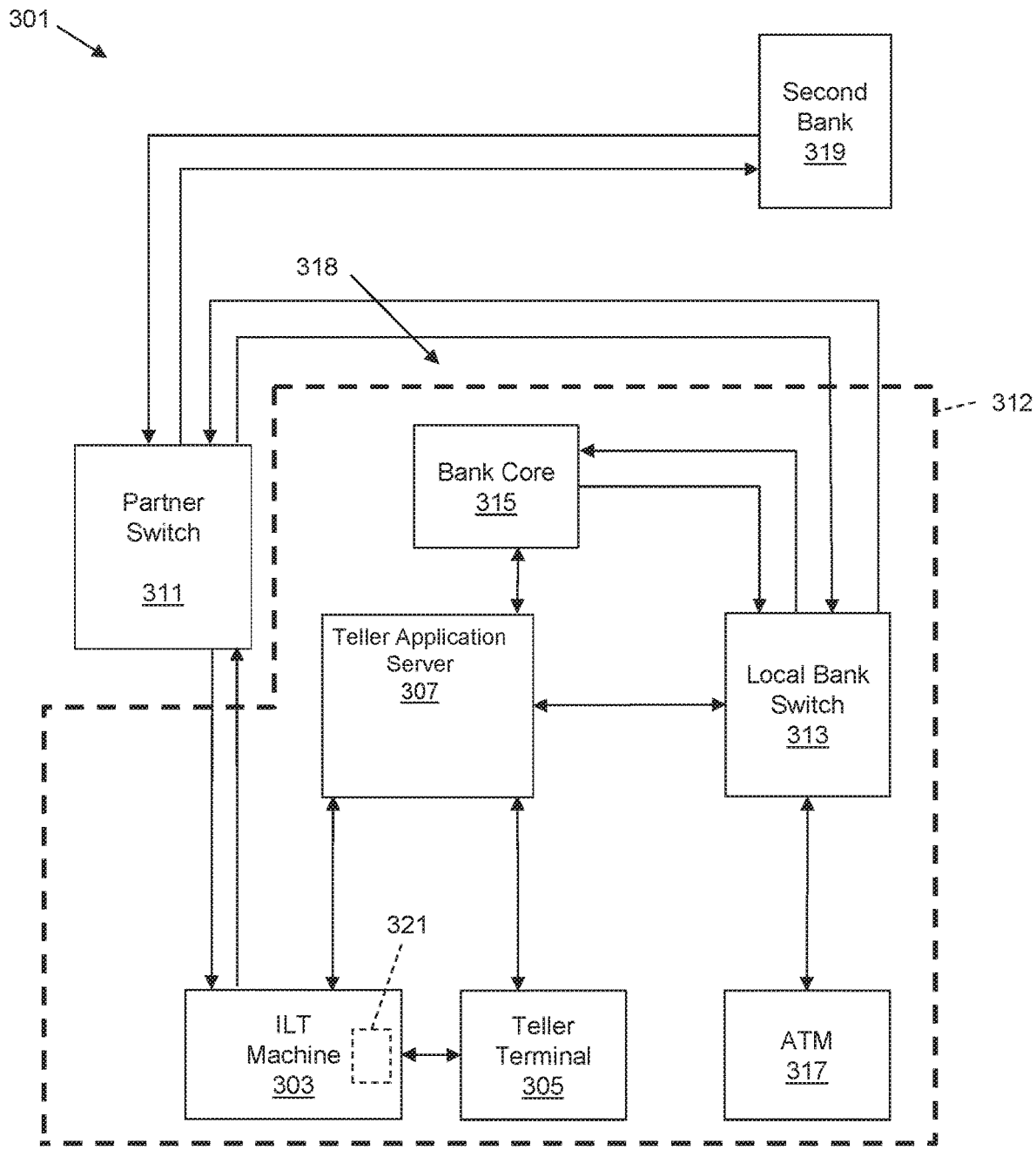
FIG. 3 illustrates another example embodiment of a system for processing tagged off-us banking transactions using a partner switch and an ILT machine with a processor.

FIG. 1 illustrates one example embodiment of a banking system 1. The system 1 includes various components that are part of a first bank network/computer system 12 that includes a local bank switch/first bank switch 13, a bank core 15 commutatively coupled to a first bank switch 13, a teller PC (teller terminal) 5, an automated-teller-machine (ATM) 17, an in-lobby-teller (ILT) machine 3, a teller application server 7 running a teller application 9. The first bank network 12 is connected to a partner switch 11 and a second bank network/computer system 14 that are both external to the first bank network system 12. Of course, and as understood by those with ordinary skill in the art, the illustrated devices and components of FIG. 1 may be connected with a variety of network configurations, have other cable types, and/or communicate with various other communication stack protocols. For example, the ATM 17 may be connected to an Ethernet type of network/cable and communicate with transition control protocol/internet protocol (TCP/IP) while the ILT machine 3 may connect to the same or a different network and/or type of cable and may communicate with the NEC direct-connect (NDC) protocol. The ILT machine 3 may further include a processor logic 321 (e.g., microprocessor as seen in FIG. 3) to assist in parsing messages/packets and in making decisions as discussed below. FIG. 3 is an illustration of a bank system 301 in which a first bank 318 and a second bank 319 communicate. The first bank 312 includes a first bank network/computer system 312, an ILT 303, a teller terminal 305, an ATM 317, a teller application server 307, a bank core 315, and a local bank switch 313. The system 301 also includes a partner switch 311.

"Processor" and "Logic", as used herein, includes but is not limited to hardware, firmware, software and/or combinations of each to perform a function(s) or an action(s), and/or to cause a function or action from another logic, method, and/or system. For example, based on a desired application or need, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

In the following description, numerous specific details are set forth in order to provide a thorough understanding of certain embodiments. It will be apparent, however, to one having ordinary skill in the art that the specific detail need not necessarily employed. In other instances, well-known materials or methods have not been described in detail in order to avoid obscuring the present description.

Embodiments include apparatuses, methods, and computer program products. Accordingly, embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read only memory (EPROM) device, a portable compact disc read-only memory (CDROM), an optical storage device, and a magnetic storage device. Computer program code for carrying out operations may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The teller terminal/teller PC 5 is in general a personal computer that may be a laptop or a desktop. Alternatively, the teller terminal 5 may be an iPad type of device, a handheld device, or another device that is capable of enabling a bank teller 6 to approve/override a transaction that a banking customer 4 is attempting to enter and process at the ILT machine 3. In this example system 1, the teller terminal 5 may be at least partially under the control of the teller application 9 running on the teller application server 7. The teller application 9 may detect banking transactions 2 that are entered into the ILT machine 3 by a banking customer 4 and that have exceeded a threshold value, such as a $5,000 limit for a cash withdrawal (e.g., debit), and then forward these transactions 2 to the teller terminal 5. The teller terminal 5 and the teller application 9 (e.g., teller software) provide screens/menus prompting and allowing the bank teller 6 the option of approving or rejecting the transaction(s) exceeding the threshold limit. In some embodiments, the teller application 9 may provide audit support with reporting capability of transactions such as when a teller approves or disapproves of various transactions.

In general, the ATM 17 is a traditional ATM where banking transactions may be conducted that generally have a lower threshold limit than the ILT machine 3. For example, cash withdrawals at the ATM 17 may not exceed $500. The first bank switch and, in general, the partner switch 11 receives transaction requests/messages/data blocks/packets of data and determines where they should be routed in order to reach their intended destination(s). The first bank switch 13 may loosely operate similar to a telephone switch and route data blocks based on their destination address. Those of ordinary skill in the art will appreciate that over time lookup-tables of destination address may be matched with paths onto which they may be routed to reach those destinations.

In general, the first bank switch 13 will not transmit transaction requests/messages/data blocks/packets of data that will re-enter the same first banking network 12 from which it originated. Thus, its source and destination addresses are different. However, transaction requests/messages/data blocks/packets of data sent to the partner switch 11 from the ILT machine 3 may be routed back into the first banking network 12 from the partner switch 11. For example, messages leave the banking network from the ILT 3 and enter the partner switch 11 and then may re-enter the banking network 12 by traveling from the partner switch 11 to the first bank switch 13.

More than one bank may share the partner switch 11 and this switch 11 may be owned by a third-party that may not be a single bank. This may be especially useful and cost effective for small banks with few branch offices because the partner switch eliminates the complexity of completely updating the software, message protocols, and/or other features of the first bank switch 13 to allow the first bank switch 13 to communicate with the ILT machine(s) 3. With a partner switch 11, the ILT machine 3 communicates directly with the partner switch 11 without the need of having the switch 11 or the ILT machine 3 needing to communicate with other legacy devices such as first bank switch 13 using legacy message formats, communication formats and protocols, and using legacy SW. Thus, the partner switch hardware comes with a connection to a network provider that will route on-us transactions back to the first bank's core 15 with minimal or, in some cases, zero changes to in-house processing by the first bank.

In general, the bank core 15 is where central databases reside so that accurate account balances are maintained. These databases of various account information may reside within the bank core 15 on multiple servers and/or other computing devices. As illustrated, the bank core 15 communicates with the first switch 13 and, in some embodiments, the teller application server 7.

A variety of different transactions may be conducted by the customer 4 at the ILT machine 3. For example, the customer 4 may request a cash withdrawal (e.g., debit) from an account such as a checking, savings account, or another type of bank account. In some embodiments, if the requested withdrawal exceeds a threshold value, such as $10,000, or another value, the transaction may first need teller approval, as discussed below. Cash deposits (e.g., credits) may be accepted at the ILT machine 3 that may be cash and/or check deposits where the check may be an "on-us" or an "off-us" deposit. On-us transactions may be executed within a bank's local switch(es) and core without leaving the banks computer network 12, while "off-us" transactions need to leave the network 12 in order to be fully executed. The system 1 of FIG. 1 may also be used to cash checks at an ILT 3 for on-us or off-us customers with an on-us check. In some embodiments, to cash a check for an on-us customer and an on-us check the ILT 3 may verify the customer's identity with the traditional use of a banking card with a personal-identification-number (PIN) and if the check is over a threshold limit value then the transaction may be teller assisted/approved through the teller application 9.

In some applications, the teller application 9 is able to handle typical teller control functions such as signature card verification. An off-us customer with an on-us item (e.g., check) may require authentication to be performed through a teller application 9 that compares signatures, photos of the customer and/or other biometric data. In some embodiments the teller application 9 may detect false IDs. Rather than bother a teller about filling out a small loan application, some customers may begin or completely fill out loan forms electronically at the ILT machine 3 before later possibly needing the assistance of a human teller.

Having described the components and features of the system 1 of FIG. 1, its use and operation in various example scenarios are now presented. In one embodiment, the teller terminal 5 allows a human bank teller 6 to approve customer requests 2 entered at one or more customer banking terminals 3. The in-lobby-teller machine (ILT machine 3) receives a banking transaction request 2 from a banking customer 4. The ILT machine 3 has a processor logic 321 (as shown in FIG. 3) that determines if the banking transaction request 2 requires the human bank teller 6 to approve the banking transaction request 2. The ILT machine 3 determines if the human bank teller 6 is required to approve the banking transaction request 2. When the banking transaction request 2 requires human teller approval, the ILT machine 3 transmits the banking transaction request 2 to the teller terminal (e.g., teller PC) 5. When the banking transaction request 2 does not require human teller approval, the ILT machine 3 does not send the banking transaction request 2 to the teller PC 5.

The teller PC 5 (e.g., teller terminal) allows the human bank teller 6 to approve the banking transaction request 2. The teller terminal 3 sets an indication field/value/bit in the banking transaction request 2 when the banking transaction request 2 is approved by the human bank teller 6. The banking transaction request 2 with the indication set is sent from the teller terminal 5, through the teller-application server 7 and then to the ILT machine 3 as an approved transaction request. The ILT machine 3 transmits the approved transaction request to the partner switch (e.g., external certified switch 11). The local bank switch (first bank switch 13) is configured to receive the approved transaction request from the external certified switch 11. The local bank switch 13 transmits the approved transaction request to the bank core 15. The bank core 15 receives the approved transaction request from the local bank switch 13 and, after at least partially processing the request, the bank core 15 then begins transmission of the approved transaction request on a route back to the ILT machine 3. The ILT machine 3 completes an execution of the approved transaction request.

In some configurations, the bank core 15 transmits the approved transaction request back to the local bank switch 13. The local bank switch 13 transmits the approved transaction request to the external certified switch 11. The external certified switch 11 transmits the approved transaction request the ILT machine 3.

In another embodiment, the banking system 1 receives from a banking customer 4 at a bank terminal 3 (ILT) a banking transaction request 2 that requires approval of a bank teller 6. The banking transaction request 2 is initiated at an ILT 3 located at a first bank 18 and is accessed over a bank network 12 and relates to an account managed by the first bank 18. The banking transaction request 2 is transmitted from the bank terminal 3 to a teller application server 7 and to a teller computer 5. The teller computer 5 provides the ability for the bank teller 6 to interface with a teller application 9 to indicate that the banking transaction request 2 is approved. In some configurations, the teller application 9 runs on the teller application server 7. The teller application server 7 may receive an approval or disapproval of the banking transaction request 2 from the teller computer 5, after the bank teller 6 approves or disapproves of the banking transaction request 2. Responsive to the banking transaction request 2 being approved, the teller application 9 tags the banking transaction request 2 as an approved off-us banking transaction.

The off-us banking transaction is then sent to an off-site partner switch 11 by the ILT 3. The off-site partner switch 11 determines where to route the off-us banking transaction and determines to route the off-us banking transaction back to the same bank network 12 that sent the transaction to the off-site partner switch 11. The off-us banking transaction is then received at the network 12 of first bank 18. The first bank 18 at least partially prepares the off-us banking transaction, in its bank core 15, as discussed later, for at least partial execution of the off-us banking transaction at the core 15, or back at the ILT 3 and/or at least partial execution at the teller application server 7 and/or its teller SW 9. The off-us banking transaction is transmitted from the first bank network 12 through the off-site partner switch 11 and back to the bank terminal/ILT 3. The ILT 3 and/or the application server 7 and its teller application 9 execute at least some of the off-us banking transaction at the first bank 18.

In some configurations, the bank terminal 3 is an in-lobby-teller (ILT) machine 3 and the banking transaction request 2 exceeds at least one limit value of an ATM banking transaction that the ILT 3 may execute without requiring approval of the bank teller 6. The banking transaction request 2 may be for a cash withdrawal amount that exceeds a withdrawal limit of an ATM 17. The ILT 3 may mechanically dispense from a cash dispensing machine an amount of cash equal to the cash withdrawal (e.g., debit) amount. In some configurations the banking transaction request 2 may be a request to withdrawal more than an amount equating to 5,000 dollars from a banking account, and in other configurations, it may be a request to withdrawal more than an amount equaling 10,000 dollars from the banking account, and in other configurations it may be a different amount. The bank terminal/ILT 3 may be configured to dispense cash for a banking transaction request 2 that includes a request for two different types of currency denominations. In other embodiments the banking transaction request 2 may be a request for a loan or to cash a check.

In other embodiments, the banking transaction request 2 is received at an ILT machine 3. The ILT 3 and/or the teller application 9 may detect that the banking transaction request 2 exceeds an ILT limit of the ILT 3. Responsive to detecting that the banking transaction request 2 exceeds the ILT limit of the ILT 3, the teller application server 7 sends the banking transaction request 2 to the teller computer 5. In some configurations, after the banking transaction request 2 is approved, the banking system 1 processes the off-us banking transaction without further human interaction other than interaction involving the banking customer 4.

In some embodiments, the application server 7 may tag the banking transaction request 2 as approved by the bank teller 6 with a tag that may include a record of which teller approved the banking transaction request 2, what action the teller approved, and/or what time and date the banking transaction request 2 was approved. When the teller approves the banking transaction request 2, some embodiments may assign a teller approval code that identifies the teller that approved the off-us banking transaction sent to the partner switch 11. In other configurations, the teller application server 7 stores a name of an approving teller, an approval time and date, and/or an action taken by the approving teller.

Of course, the system 1 may be simultaneously processing/routing more than one banking transaction request received at an ILT. For example, a second different banking transaction that is also a teller approved off-us transaction may be routed by a second ILT to the off-site partner switch 11. The second banking transaction may be generated by a second bank 19 that is different than the first bank 18. A cost of the off-site partner switch 11 including its certification may be borne by the first bank 18 and the second bank 19. The off-site partner switch 11 may be a certified banking switch that has a verifiable reliability for routing off-us teller approved types of transactions.

In other embodiments, transmitting the off-us banking transaction 2 from the first bank 18 through the off-site partner switch 11 and back to the bank terminal 3 further includes transmitting the off-us banking transaction 2 from a bank core 15 to a first bank switch 13 in the bank network 12. Next, the off-us banking transaction 2 is transmitted from the first bank switch 13 to the off-site partner switch 11. In some configurations, the system 1 transmits the off-us banking transaction, in reverse, back to the bank terminal 3 so that a same path that the off-us banking transaction traveled from is retraced. The retraced path may include traveling from the first bank network/computer system 12, through the off-site partner switch 11, and then to the bank terminal 3.

Figure 2:
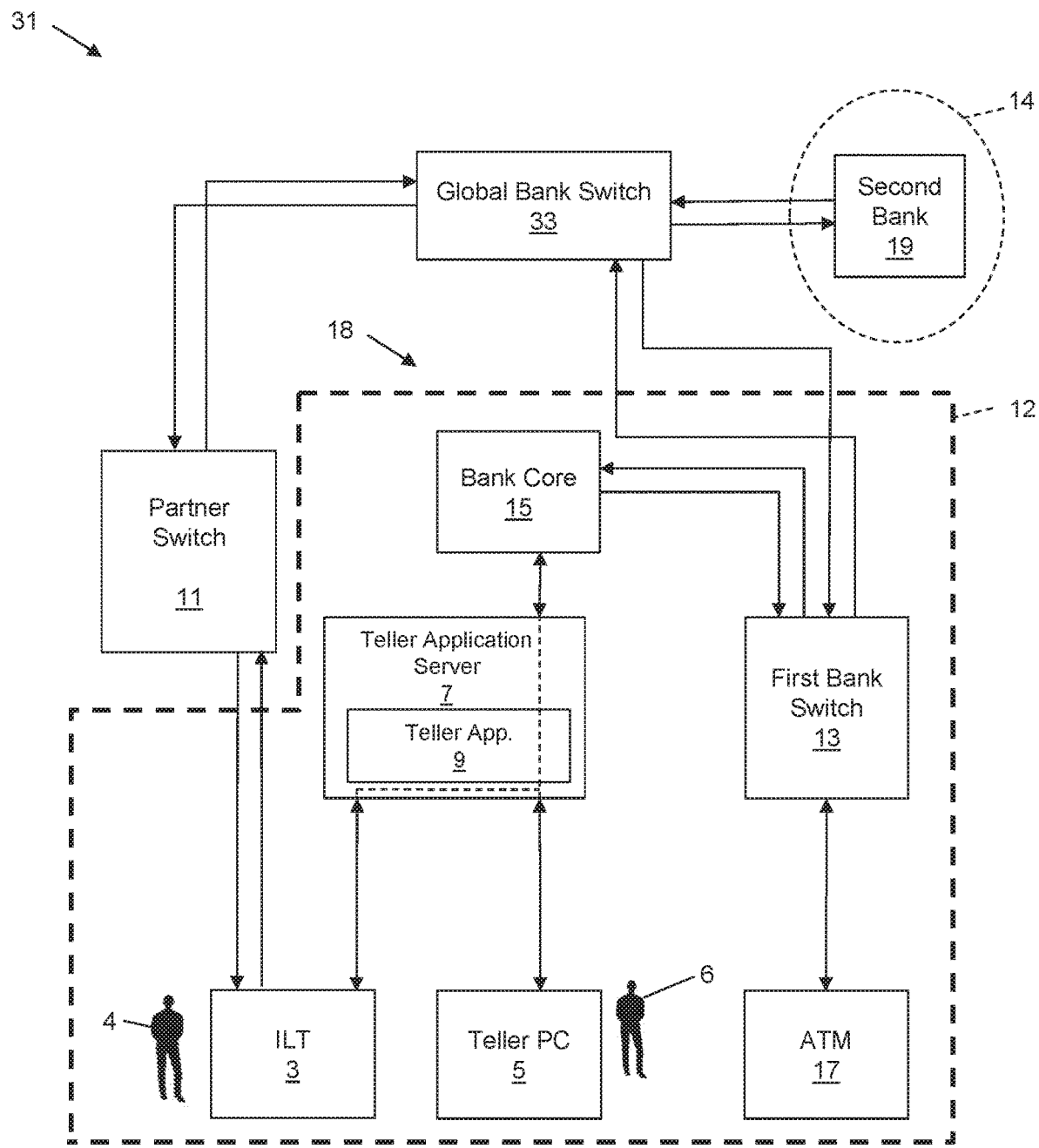
FIG. 2 illustrates another example embodiment of a system for processing tagged off-us banking transactions using a partner switch.

In another embodiment, the system 1 of FIG. 2 may be utilized to cash an on-us check receiving at an ILT 3 of a first bank 18. This is a request for cash from a presented check associated with an on-us banking account maintained at the first bank 18 and the presented check is made out to an "off-us person" (someone from a different bank, second bank 19) without a corresponding banking account at the first bank 18. The ILT 3, or teller application server 7 will generate an authentication message based on an ID of the off-us person to request credential authentication of the off-us person. The teller application server 7 sends the authentication message to a switch 13 of the first bank's network/computer system 12. The switch 13 next sends the authentication message to a global bank switch 33 that is external to the first bank 18 and a second bank 19. The global bank switch 33 is part of a banking system 31. Next, the global bank switch 33 sends the authentication message to the second bank 19 maintaining an account associated with the off-us person. The switch 13 of the first bank 18 receives an authentication response message that originated at the second bank 19 and is a response to the authentication message. The authentication response message travels from the switch 13 to the ILT 3. Responsive to the authentication response message, the ILT 3 executes the request for cash by dispensing cash in an amount authorized on the presented check.

In some configurations, the cash request is for an amount of cash that is above an ATM limit for an amount of cash that the ATM 17 is authorized to dispense, but is below an ILT limit for an amount of cash that the ILT 3 is authorized to dispense so that the presented check does not require a bank teller's approval.

Figure 4:
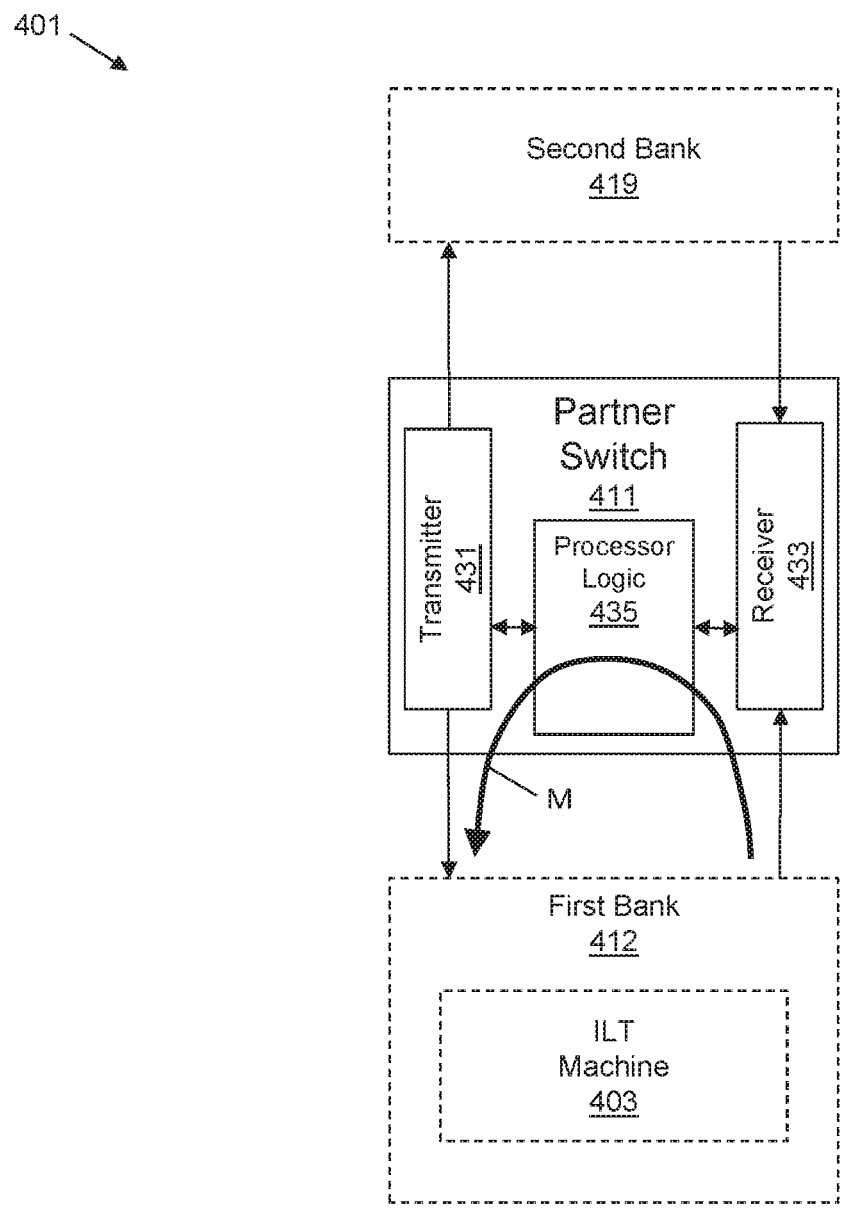
FIG. 4 illustrates one example embodiment of a system for processing tagged off-us banking transactions using a partner switch having a processor logic.

FIG. 4 illustrates an example system 401 having a partner switch 411 coupled to a first bank 412 with an ILT machine 403 a second bank 419. The partner switch 411 has a transmitter 433, a receiver, and a processor logic 435. The transmitter 431 and receiver 433 transmit and receive data such as packets of fixed size or variable and other types of data. The processor logic 435 may run software instructions and has the ability to analyze data information and to determine where received data should be routed. For example, the receiver 433 receives from the first Bank 412 an ILT banking request tagged as approved by a teller. The processor logic 435 determines to route the ILT banking request directly back to the first bank 412. The ILT banking request is fully processed by the first bank 412 without a second bank 419 receiving the ILT banking request. The transmitter 431 will transmit the ILT banking request back to the first bank 412. In some configurations, the transmitter 431 transmits the ILT banking request back to a switch 413 of the first bank 412.

Figure 5:
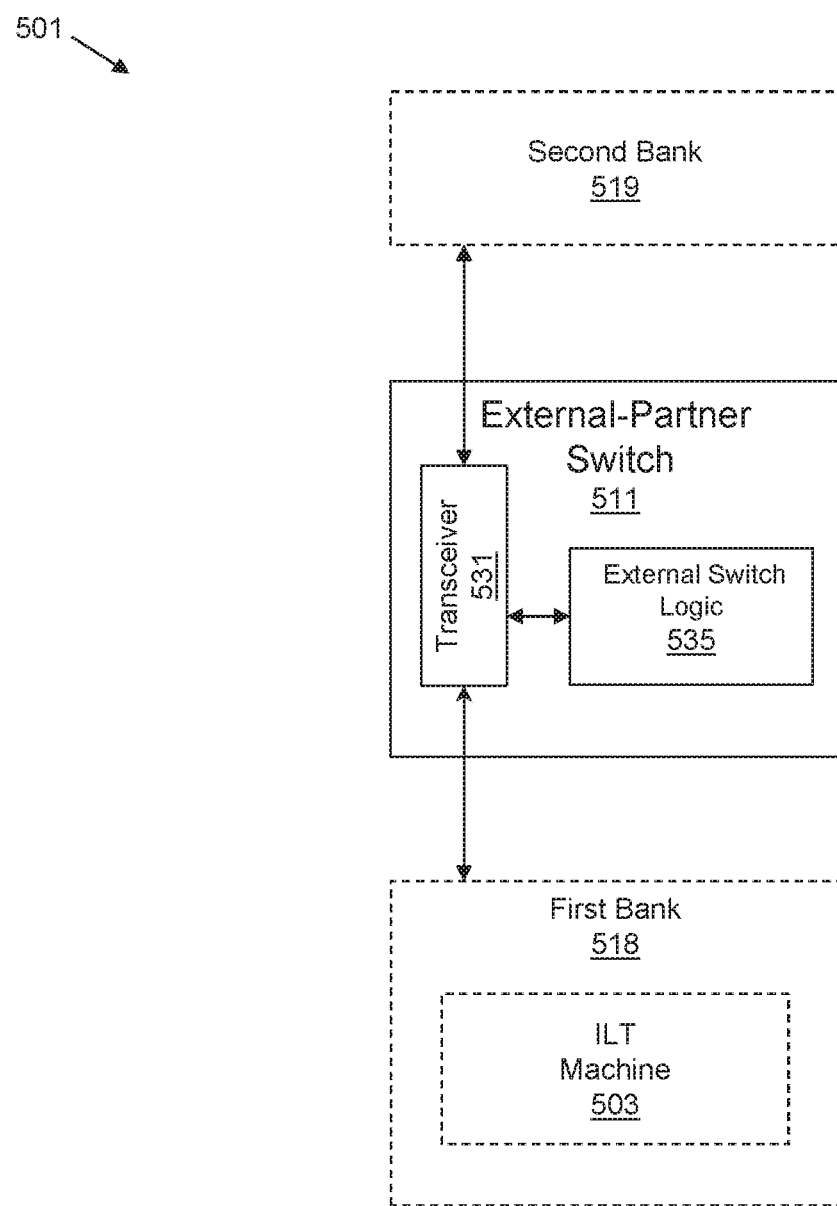
FIG. 5 illustrates one example embodiment of a system for processing tagged off-us banking transactions using a partner switch having an external switch logic.

Another embodiment, as illustrated in FIG. 5 is an external-partner switch 511 that re-routes off-us banking transactions back to the same bank that generated that banking transaction. The external-partner switch 511 includes a transceiver 531 and external switch logic 535. In operation, the transceiver 531 will receive an off-us banking transaction from a first bank 18 that generated the message as a transaction request. This request may be approved to become tagged as off-us banking transaction. The external switch logic 535 re-routes the message based, at least in part, on an address in the message and the tag of the message as an off-us message. The external-partner switch 511 and the external switch logic 535 may be certified according to at least one quality standard. The external switch logic 535 resends the message back to the first bank 18, where the off-us banking transaction is performable by the first bank 18. The transceiver 531 transmits the message back to the first bank 18 where it may now be executed.

In other embodiments, the external switch logic 535 of the external-partner switch 511 sends the message to a second bank 519 when an execution of the off-us banking transaction is, at least in part, associated with the second bank 519. In some configurations, the second bank 519 approves a signature on a check presented at the first bank 518. The check is associated with an account maintained by the first bank 518, and the signature is associated with a banking account maintained by the second bank 519.

Returning to FIG. 1, the banking system 1 may operate to verify with bank 18 or bank 19 to determine the authentication of a person cashing a check at bank A. An ILT 3 at bank 18 receives a check presented by the first customer that has an account at bank 19 but no account at bank 18. The check was written by bank Customer A having a banking account at bank 18. The teller 6 at bank 18 reviews the check and decides whether to approve the check and if so generates a check cashing request (e.g., message) with an approval tag indicating the check cashing request is teller approved (or not teller approved). For example, the teller 6 may using a Teller PC 5 connected to a teller server 7 that sets the approval tag by setting a bit in the check cashing request to a first value indicating the check cashing request has been approved by a teller of bank 18 or setting the bit to a second value indicating the check has not been approved.

In some embodiments, checks may be imaged at the time when it is decided that the check may need teller approval. Checks, deposits and the like may also be imaged when they are used to receive funds, deposit funds, perform a verification of the check or another document and images may be captured in other circumstances as understood by those of ordinary skill in the art. At the time of imaging, MICR lines on a check may be read by MICR strip readers and routing numbers may be determined from the check and/or captured image(s). In some embodiments, the scanned image(s) of a document/check may be forwarded to the partner switch 11 when a transaction associated with that image is transmitted to the partner switch. Some of these transaction may be labeled "force post" which will for a bank processing the check even when the check exceeds a limit that may normally prevent a check from being cashed.

Once the check is tagged as acceptable, an identity of the first customer needs to be verified. For example, bank 18, via the ILT 3 and/or teller application server will initially try to verify within bank 18 an identity of the first customer. One example way to authenticate/verify the first customer is indeed who they claim to be is by comparing a current/recent photograph of the first customer with a known image of the first customer. For example, bank 18 may capture a first picture of the first customer with a camera located near the ILT 3 after the first customer has approached bank 18 with the check. The ILT 3 of bank 18 may then recover a second picture of the first customer from a controlled source. For example, the controlled source may be a government issued identification (ID). The ILT 3 may then verify the first customer by determining if the first customer is a same person in the first picture and the second picture. Of course, other verifications can include verifying signatures of the first customer and/or in other ways understood by those of ordinary skill in the art.

When the first customer has not been verified by bank 18, the ILT 3 (or in some embodiments, the teller application server 7/teller application 9) may send a verification request to bank 19 to verify the identity of the first customer. The teller server 7 later receives a response to the verification request back from bank 19. If the first customer has been verified by either bank 18 or bank 19, and when the check cashing request has been tagged as teller approved, the ILT 3 sends the check cashing request with the approval tag as an off-us request to a partner switch 11 that is external to bank 18. The partner switch 11 routes this request back into bank 18 where the check cashing request is received at switch 13 from the partner switch 11. The check cashing request is at least partially processed in a core 15 of bank 18 to create a core-processed cashing-request. The core-processed cashing-request is sent by the core 15 addressed to the partner switch. Upon receipt, the partner switch 11 sends core-processed cashing-request to the ILT 3 of bank 18. The core-processed cashing-request is processed to completion at bank 18 including the ILT 3 presenting funds to the first customer.

The banking system of FIG. 1 may also send two (or more) different transaction requests to the partner switch 11 when completing what appears to the banking customer to be a single transaction. For example, cashing and depositing money represented by a check in a banking account requires two transactions. First, the check needs verified and cashed to receive its funds. Second, those funds need to be deposited (e.g., credited) into one or more desired banking accounts.

In more detail, consider an example where an ILT 3 receives the check at bank 18 that is presented by the first customer who has an account B at bank 19 but no account at bank 18. The ILT 3 determines that the check is a banking transaction that is to, in part, access Account A of Customer A at bank 18. The ILT 3 forwards this information to a bank teller 6. It the teller 6 approves an amount of the transaction and the check involving Customer A and the first customer, then the teller application server 7/teller SW 9 generates a first transaction request with an approval tag indicating the first transaction request is teller approved.

Similar to the earlier discussion, bank 18 may attempt to verify within bank 18 an identity of the first customer. When the first customer has not been verified by bank 18, the teller application server 7 or the ILT 3 may send a verification request to bank 19 in an attempt to verify the identity of the first customer. When Customer A has not been verified by bank 18, bank 19 will receive a response the verification request to bank B back from bank 19. When the first customer has been verified by either bank 18 or bank 19, and when the first transaction request has been tagged as teller approved, the ILT sends the first transaction request with the approval tag as an off-us request to the partner switch 11 external to a first bank network/computer system 12 of bank 18. For example, the first transaction request may be a request to withdrawal an amount of the check from Customer A's bank account at Bank.

Because the transaction is tagged as an off-us request, the partner switch 11 routes the first transaction request back into the computer network 12 where it is received. The request is at least partially processed (Customer A's bank account reduced by the amount of the check) in the core 15 of bank 18 and a result message is sent back to the application server 7 and/or the ILT 3. Upon successful completion of the first transaction request, the ILT 3 or the application server 7 will create an off-us second transaction request to request the funds of the check be deposited into the first customer's bank account at bank 19.

The second transaction request is sent from the ILT 3/first banking network 12 of bank 18 to the partner switch 11 and from the partner switch 11 to a second banking network 14 of bank 19. bank 19 processes the second transaction request at bank 19 by accessing account B of the first customer to credit that account with the amount of the check and to produce a receipt message. The receipt message from the second banking network 14 of bank 19 is sent to the partner switch 11 and then from the partner switch 11 to bank 18. At bank 18, the receipt message is processed to close out the banking transaction.

Example methods may be better appreciated with reference to flow diagrams. For purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not-illustrated blocks. Thus, the depicted blocks, functions and/or other components may be implemented as parts of a monolithic software structure, as standalone software modules, or as modules that employ external routines, code, services, and so forth, or any combination of these. All such implementations are within the scope of the present disclosure.

Figure 6:
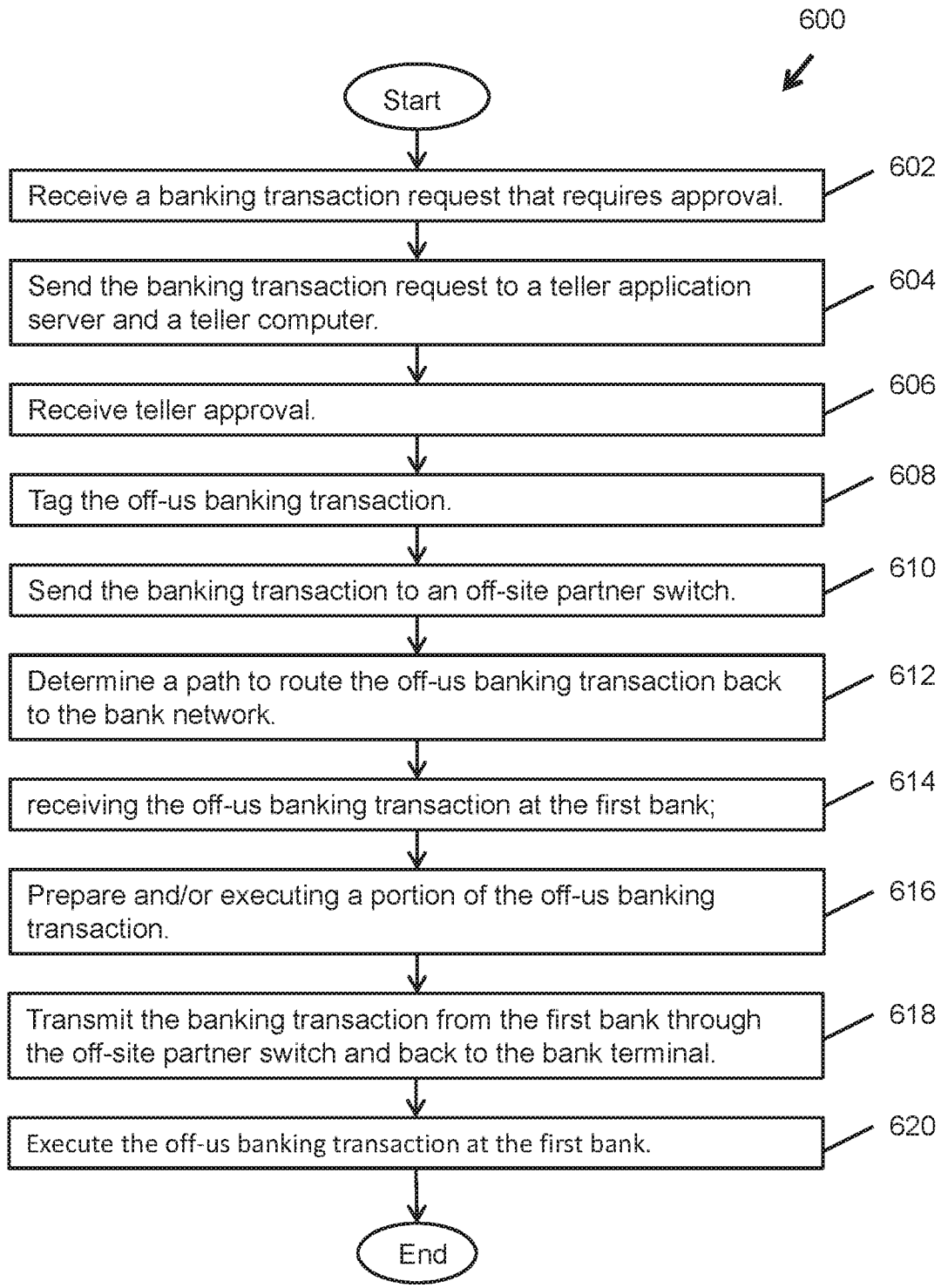
FIG. 6 illustrates one example embodiment of method for processing tagged off-us banking transactions using a partner switch.

FIG. 6 illustrates a method 600 which is a method of using an off-site partner switch to re-route an off-us transaction request back into a banking network that the transaction request originated from. The method begins by receiving from a banking customer at a bank terminal (e.g., ILT) a banking transaction request, at 602, that requires approval of a bank teller. The banking transaction request is initiated at a first bank and accesses an account managed by the first bank over a bank network. The banking transaction request is sent, at 604, to a teller application server and/or a teller computer. The bank teller will interface with a teller application to indicate that the banking transaction request is approved. In some embodiments, the teller application is running on the teller application server.

The teller application server receives, at 606, an approval of the banking transaction request from the teller computer, when the bank teller approves the banking transaction request. Responsive to the banking transaction request being approved, the banking transaction request is tagged, at 608, as an approved off-us banking transaction. The off-us banking transaction is sent to an off-site partner switch, at 610. The off-site partner switch determines where to route the off-us banking transaction and determines, at 612, to route the off-us banking transaction back to the bank network. As discussed above, the partner switch may be a shared third-party switch. The off-us banking transaction is received at the first bank, at 614. A portion of the off-us banking transaction is prepared and/or executed, at 616. This is generally performed in a bank core computer as discussed above. The off-us banking transaction is transmitted from the first bank through the off-site partner switch and back to the bank terminal, at 618. The method 600, at least partially prepares and/or executes, at 620, a portion of the off-us banking transaction, at the first bank.

Figure 7:
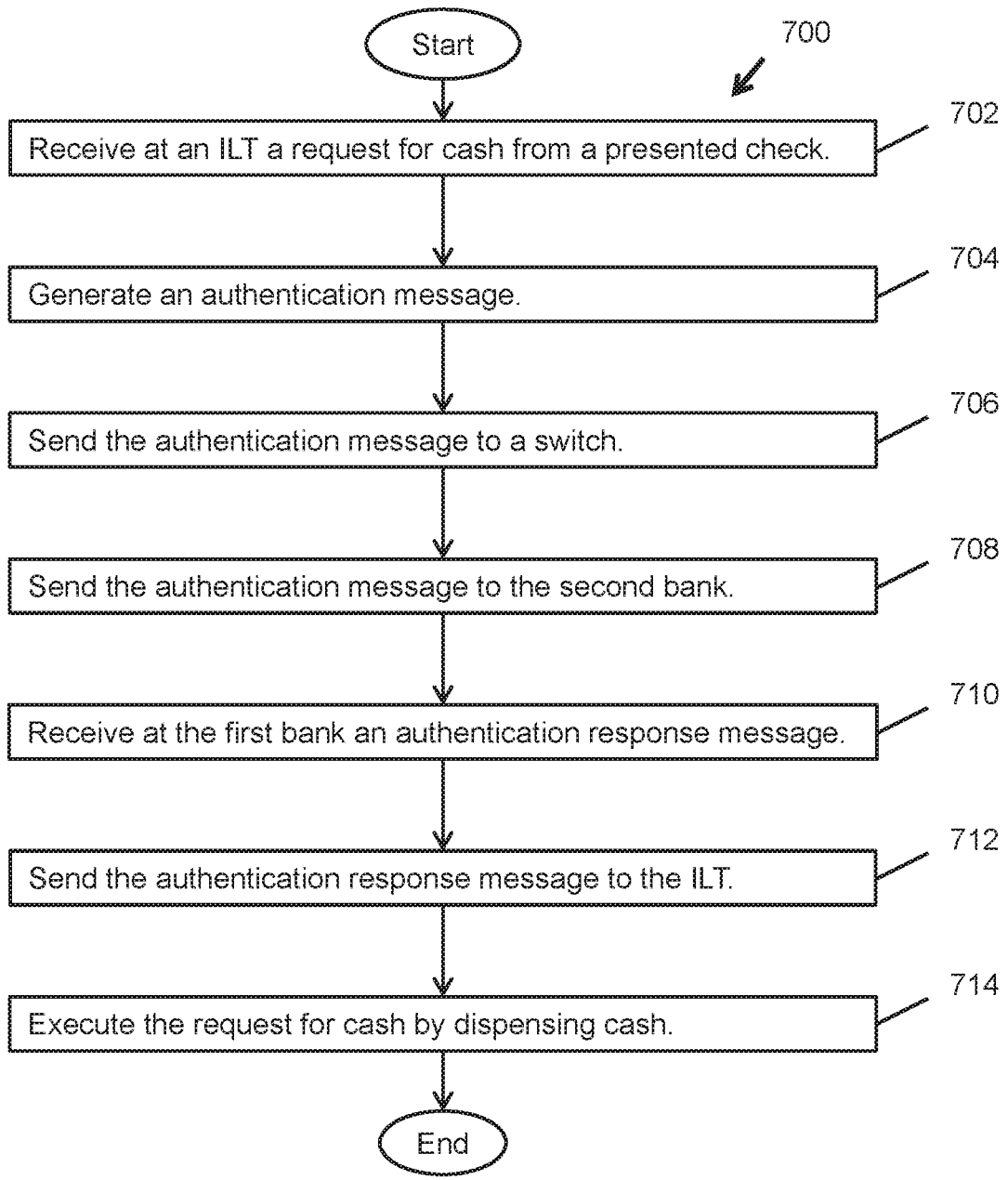
FIG. 7 illustrates another example embodiment of method for processing tagged off-us banking transactions using a partner switch.

FIG. 7 illustrates an exemplary method 700 of authenticating a person cashing a check at a bank using a partner switch. The method 700 begins by receiving at an ILT at bank 18, a request for cash, at 702, from a presented check. The check is associated with an on-us banking account maintained at the first bank. The presented check is made out to an off-us person without a corresponding banking account at the first bank. An authentication message is generated, at 704, based on an identification (ID) of the off-us person to request credential authentication of the off-us person. The authentication message is sent, at 706, to a switch. The switch then directs the authentication message, at 708, to the second bank 19 maintaining an account associated with the off-us person.

An authentication response message is received at a core of the first bank 18 that originated at the second bank 19, at 710. After the core performs any necessary operations related to the message, the authentication response message is sent to the ILT, at 712. Responsive to the authentication response message, the request for cash is executed by the ILT 3, at 714, by dispensing cash in an amount authorized on the presented check.

Figure 8:
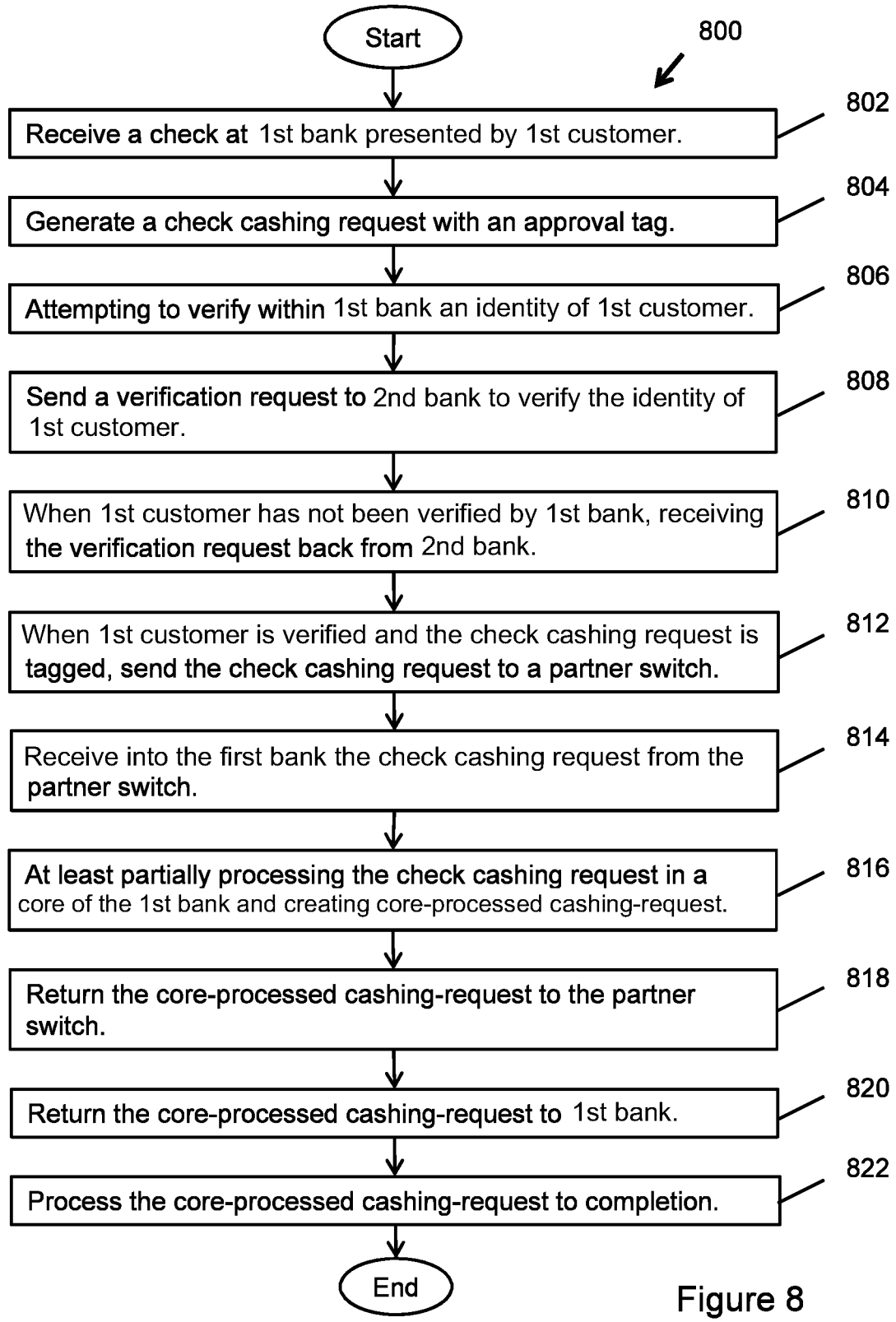
FIG. 8 illustrates another example embodiment of method for processing tagged off-us banking transactions using a partner switch.

FIG. 8 illustrates an example method 800 of processing a check cashing request by verifying the presenter of a check at one of two banks. The method 800 begins by receiving a check, at 802, at bank 18 presented by the first customer. The first customer has an account at bank 19 but no account at bank 18. The check was written by bank Customer A having a banking account at bank 18. A teller 6 generates the check cashing request with an approval tag indicating the check cashing request is teller approved or not teller approved, at 804.

The method 800 attempts to verify within bank 18 an identity of the first customer, at 806. For example and as previously mentioned, this may be done by capturing a first picture of the first customer after the first customer has approached bank 18 with the check. Next, a second picture of the first customer is recovered from a controlled source. The controlled source may be a government issued identification (ID). A verification/authentication is made of the first customer by determining if the first customer is a same person in the first picture and the second picture. When Customer A has not been verified by bank 18, a verification request is sent to bank 19, at 808, to verify the identity of the first customer. Also, when the first customer has not been verified by bank 18, a verification response is received back from bank 19, at 810. When the first customer has been verified/authenticated by bank 18 or bank 19, and when the core 15 sends the check cashing request has been tagged as teller approved, the method 800 sends the check cashing request with the approval tag, at 812, as an off-us request to a partner switch 11 external to bank 18. The check cashing request is received at bank 18 from the partner switch 11, at 814, and the core 15 at least partially processes the check cashing request, at 816, in a core of bank 18 to create a core-processed cashing-request. The core-processed cashing-request is returned to the partner switch, at 818. The core-processed cashing-request is returned to bank 18, at 820. The core-processed cashing-request is processed to completion at bank 18 including presenting funds to the first customer, at 818.

Figure 9:
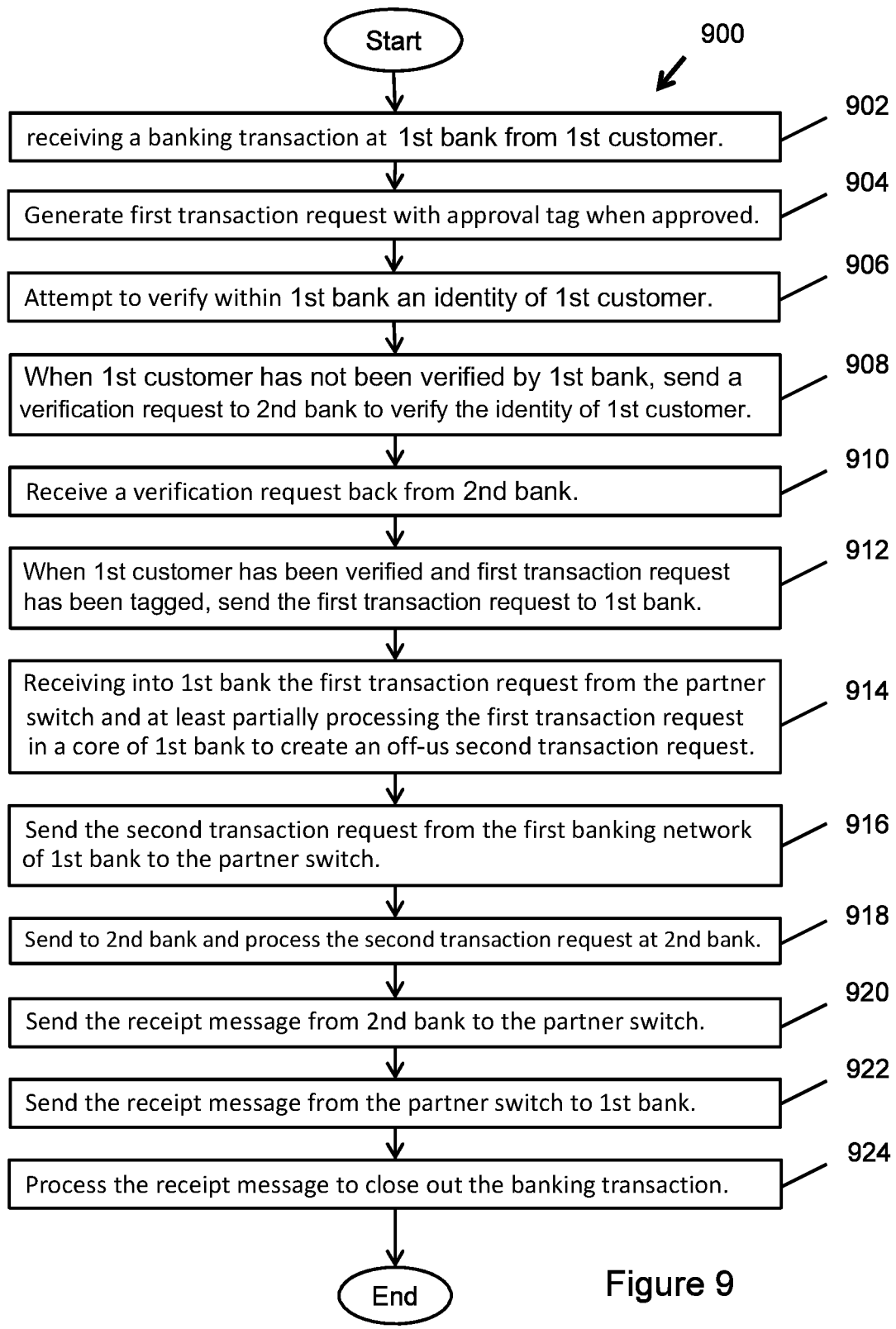
FIG. 9 illustrates another example embodiment of method for processing tagged off-us banking transactions using a partner switch.

FIG. 9 is an example method 900 of processing a banking transaction that requires actions of two different banks to execute the transaction. The method 900 begins by receiving a banking transaction at an ILT 3 of bank 18, at 902. The check is presented by the first customer that has an account B at bank 19 but no account at bank 18. The banking transaction is to, in part, access Account A of Customer A at bank 18. A teller generates a first transaction request with an approval tag, at 904, indicating the first transaction request is teller approved.

An attempt is made to verify within bank 18 an identity of the first customer, at 906. When Customer A has not been verified by bank 18, the core 15 sends a verification request to bank 19, at 908, to verify the identity of the first customer. When the first customer has not been verified by bank 18, a verification response is received, back from bank 19, at 910. When the first customer has been verified by bank 18 or bank 19, and when the and the first transaction request has been tagged as teller approved, the first transaction request with the approval tag is sent as an off-us request, at 912, from a partner switch 11 external to a first banking network of bank 18.

The first transaction request is received into bank 18 from the partner switch 11 and at least partially processed, at 914, in a core of bank 18 to create an off-us second transaction request. An off-us second transaction request from the first banking network of bank 18 to the partner switch 11, at 916. The second transaction request is sent, at 918, to a second banking network of bank 19 and, at least partially, processed at bank 19. The second transaction request is processed by accessing an account B of the first customer to produce a receipt message, at 920. The receipt message is sent from the second banking network of bank 19 to the partner switch, at 922. The receipt message is sent from the partner switch to bank 18, at 924. The receipt message is processed, at 924, to close out the banking transaction.

Figure 10:
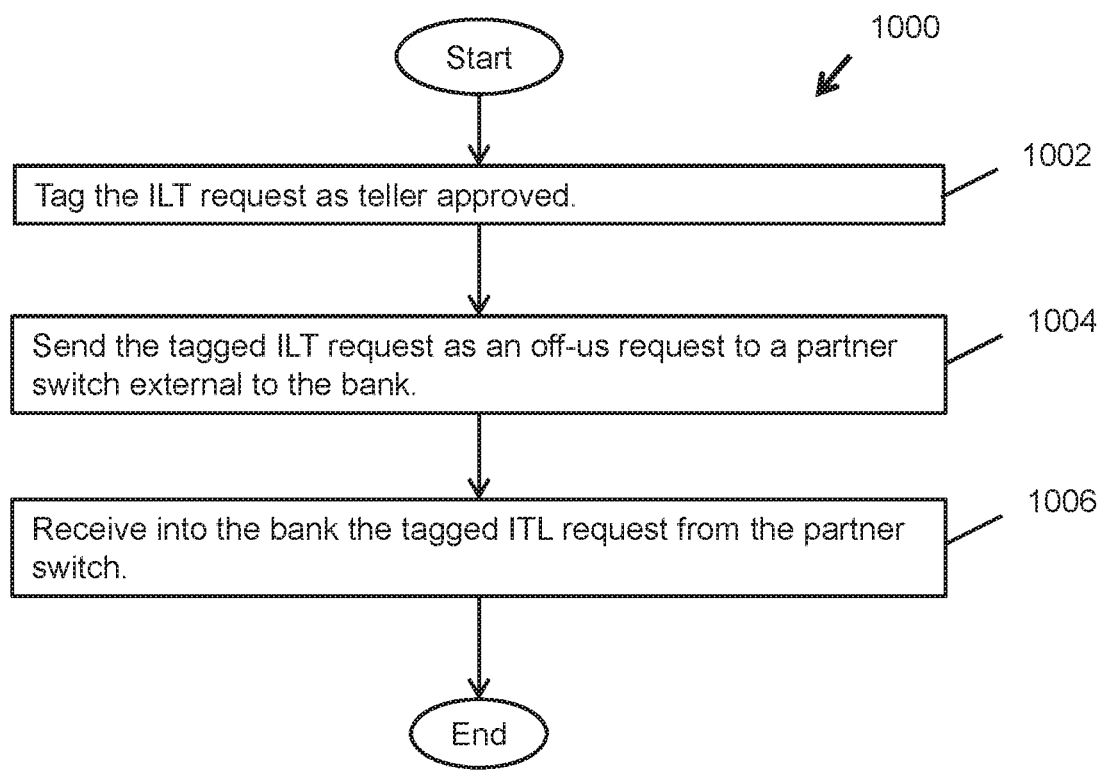
FIG. 10 illustrates another example embodiment of method for processing tagged off-us banking transactions using a partner switch.

FIG. 10 illustrates a method of processing an ILT request at a partner switch. The method 10 begins by tagging the ILT request as teller approved at a first bank, at 1002, to create a tagged ILT request. The tagged ILT request is sent as an off-us request, at 1004, to a partner switch 11 external to the bank 18. The method 1000 receives into the bank the tagged ILT request from the partner switch, at 1006. In some embodiments, the tagged ILT request is received in a condition to process to completion at the bank without requiring action by a second bank. Other embodiments, processes the ILT request to completion within the bank.

Figure 11:
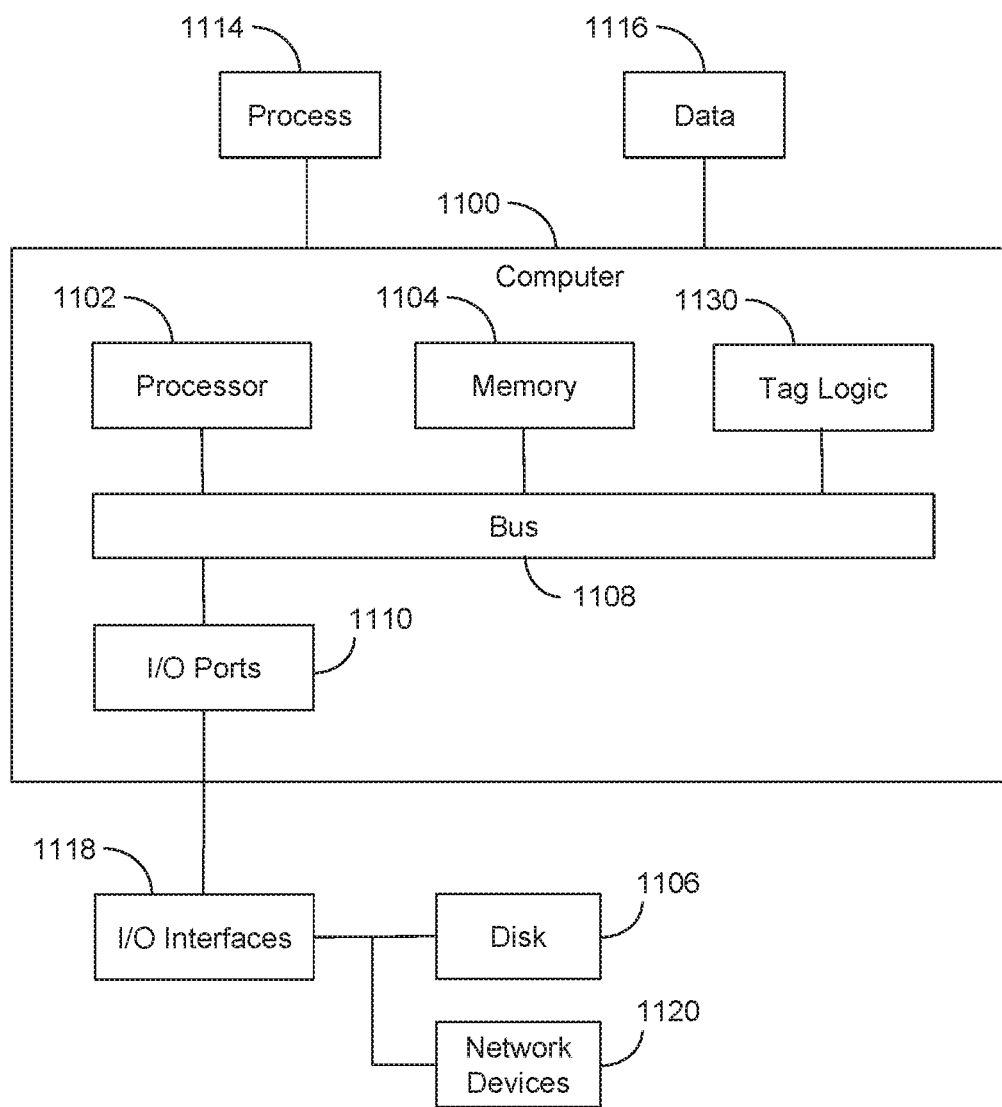
FIG. 11 illustrates an example embodiment schematic diagram of a system for tagging and processing off-us banking transactions using a partner switch.

FIG. 11 illustrates an example computing device in which example systems and methods described herein, and equivalents, may operate. The example computing device may be a computer 1100 that includes a processor 1102, a memory 1104, and input/output ports 1110 operably connected by a bus 1108. In one example, the computer 1100 may include a tag logic 1130 configured to allow a teller to tag (e.g., flag) banking transaction that the teller has approved. In different examples, tag logic 1130 may be implemented in hardware, software, firmware, and/or combinations thereof. Thus, the tag logic 1130 may provide means (e.g., hardware, software, firmware) for allowing a bank teller to tag transactions for approval and for a partner switch, as discussed above, to recognizes those tagged transactions and re-route them back into a bank that tagged those messages. While the tag logic 1130 is illustrated as a hardware component attached to bus 1108, it is to be appreciated that in one example, the tag logic 1130 could be implemented in the processor 1102.

Generally describing an example configuration of the computer 1100, the processor 1102 may be a variety of various processors including dual microprocessor and other multi-processor architectures. The memory 1104 may include volatile memory and/or non-volatile memory. The non-volatile memory may include, for example, ROM, programmable read only memory (PROM), EPROM. The volatile memory may include, for example, RAM, synchronous random access memory (SRAM), dynamic random access memory (DRAM), synchronous dynamic random access memory (SDRAM), double data rate synchronous dynamic random access memory (DDR SDRAM), direct Rambus random access memory (DRRAM) and the like.

A disk 1106 may be operably connected to the computer 1100 via, for example, an input/output interface (e.g., card, device) 1118 and an input/output port 1110. The disk 1106 may be, for example, a magnetic disk drive, a solid state disk drive, a floppy disk drive, a tape drive, a Zip drive, a flash memory card, and/or a memory stick. Furthermore, the disk 1106 may be a compact disc-ROM (CD-ROM), a compact disk (CD) recordable drive (CD-R drive), a CD rewriteable drive (CD-RW drive), and/or a digital video ROM drive (DVD ROM). The memory 1104 can store a process 1114 and/or the data 1116, for example. The disk 1106 and/or the memory 1104 can store an operating system that controls and allocates resources of the computer 1100.

The bus 1108 may be a single internal bus interconnect architecture and/or other bus or mesh architectures. While a single bus is illustrated, it is to be appreciated that the computer 1100 may communicate with various devices, logics, and peripherals using other busses (e.g., PCIE, SATA, Infiniband, 1384, USB, Ethernet). The bus 1108 can be types including, for example, a memory bus, a memory controller, a peripheral bus, an external bus, a crossbar switch, and/or a local bus.

The computer 1100 may interact with input/output devices via the input/output interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, universal-serial bus (USB) ports and the like.

The computer 1100 can operate in a network environment and thus may be connected to the network devices 1120 via the input/output interfaces 1118, and/or the input/output ports 1110. Through the network devices 1120, the computer 1100 may interact with a network. Through the network, the computer 1100 may be logically connected to remote computers. Networks with which the computer 1100 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, this description is not limited to the specific details, the representative embodiments, and illustrative examples shown and described. Thus, this application is intended to embrace alterations, modifications, and variations that fall within the scope of the appended claims.

Moreover, the description and illustration are exemplary and are not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

While principles and modes of operation have been explained and illustrated with regard to particular embodiments, it must be understood, however, that this may be practiced otherwise than as specifically explained and illustrated without departing from its spirit or scope.

What is claimed is:

1. A banking system comprising:
  a bank core;
  an in-lobby-teller machine (ILT machine) that is commutatively coupled to the bank core over a first bank network system and is configured to receive a banking transaction request that is an on-us banking transaction from an on-us banking customer;
  a teller application server operating a teller application in the first bank network system with the ILT machine, said teller application server configured to tag the banking transaction request as an off-us banking transaction;
  a partner switch that is certified and external to the first bank network system;
  wherein the ILT machine is also configured to transmit the banking transaction request tagged as an off-us transaction to the partner switch outside of the first bank network system instead of to a legacy device operating within the first bank network system;
  wherein the partner switch is further configured to label the banking transaction request, originating as the on-us transaction and then tagged as the off-us banking transaction, as force post and direct the banking transaction request back to the first banking network system; and
  wherein the ILT machine is configured to complete an execution of the banking transaction request after said partner switch directs the banking transaction request back to the first banking network system.

2. An external-partner switch comprising:
  a transceiver configured to receive a message from a first bank that generated the message, wherein the message is a banking transaction request for an on-us banking transaction tagged as an off-us banking transaction;
  an external switch logic configured to re-route the banking transaction request based, at least in part, on destination address in the banking transaction request, wherein the external switch logic is certifiable according to at least one banking standard, and wherein the external switch logic is configured to direct the banking transaction request back to the first bank in response to the banking transaction request being off-us and the destination address, wherein the external switch logic is further configured to label the banking transaction request as force post; and
  wherein the transceiver is configured to transmit the banking transaction request back to the first bank after the banking transaction request has been labelled as force post.

3. A method of processing an on-us banking transaction request input at an in-lobby teller (ILT) at a first bank comprising:
  tagging, with a teller application server operating in a first bank network system with the ILT, the banking transaction request as off-us, despite the banking transaction request being on-us, to create a tagged ILT request;
  sending, with the ILT, the tagged ILT request outside of the first bank network system to a partner switch external to the first bank network system instead of to a legacy device operating within the first bank network system;
  labeling, with the partner switch, the tagged ILT request as force post;
  transmitting, with the partner switch, the tagged ILT request, labelled force post, back to the first bank network system; and receiving, with a core operating in the first bank network system, the tagged ILT request, labeled force post, from the partner switch after said sending.

\* \* \* \* \*